United States Patent [19]

Hashizaki et al.

[11] Patent Number: 4,796,545
[45] Date of Patent: Jan. 10, 1989

[54] APPARATUS FOR TREATING COMBUSTION EXHAUST GAS

[75] Inventors: Katsuo Hashizaki; Toshio Koyanagi; Atsushi Morii, all of Nagasaki, Japan

[73] Assignee: Mitsubishi Jukogyo Kabushiki Kaisha, Japan

[21] Appl. No.: 167,044

[22] Filed: Mar. 11, 1988

[30] Foreign Application Priority Data

Mar. 30, 1987 [JP] Japan ................................ 62-74168
Aug. 12, 1987 [JP] Japan ............................... 62-201145

[51] Int. Cl.$^4$ .............................................. F23J 3/00
[52] U.S. Cl. ..................................... 110/216; 110/203; 110/204; 110/165 A
[58] Field of Search ................... 110/165 A, 203, 204, 110/216, 217

[56] References Cited

U.S. PATENT DOCUMENTS

| | | | |
|---|---|---|---|
| 3,788,243 | 1/1974 | Eff | 110/216 X |
| 4,021,184 | 5/1977 | Priestley | 110/216 X |
| 4,620,492 | 11/1986 | Vogg et al. | 110/216 X |
| 4,638,747 | 1/1987 | Brock et al. | 110/216 X |

Primary Examiner—Edward G. Favors
Attorney, Agent, or Firm—Toren, McGeady & Associates

[57] ABSTRACT

An apparatus for treating a combustion exhaust gas is here provided which comprises a fire furnace, a denitrating reactor for denitrating the combustion exhaust gas discharged from the fire furnace, a dust collector for collecting solids in the exhaust gas passed through the reactor, and a transport pipe for circulating the solids collected by the dust collector through the fire furnace, the apparatus being characterized in that the transport pipe is provided with an arsenic removal means for removing arsenic from the solids. The arsenic removal means may be a heating device or a washing device. The dust collector may be provided with a means for discarding the solids having a particle diameter of 10 $\mu$m or less.

4 Claims, 7 Drawing Sheets

APPARATUS FOR TREATING COMBUSTION EXHAUST GAS

FIELD OF THE INVENTION AND RELATED ART STATEMENT

The present invention relates to an apparatus for treating a combustion exhaust gas in a vapor generation equipment using the system in which solids such as fly ash and the like are collected and then recycled through a fire furnace.

First, reference will be made to a conventional system in which a dry smoke denitrating apparatus is connected to an ash recycle type boiler, in reference to accompanying FIG. 4.

Figure 4:
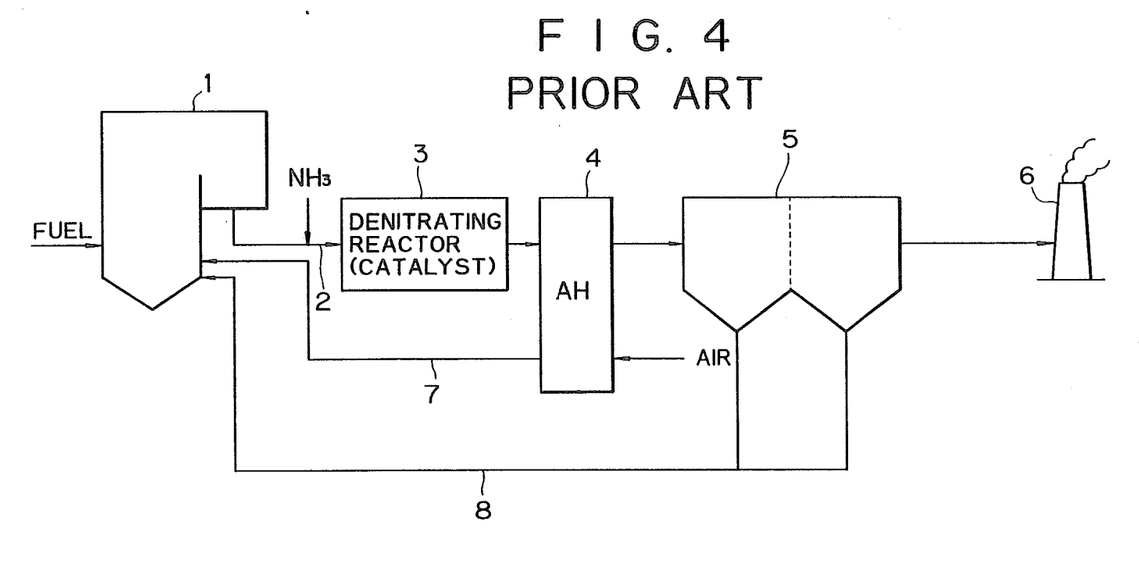
FIG. 4 is a block diagram illustrating a conventional apparatus for treating the combustion exhaust gas.

In FIG. 4, an exhaust gas from a fire furnace 1 of a boiler is introduced into an exhaust gas duct 2 through an outlet of an economizer (not shown), and in the duct 2, the exhaust gas is then mixed with an $NH_3$ gas for a denitrating reaction coming through an inlet for the gas. Afterward, the exhaust gas is led to a denitrating reactor 3. When passing through a catalytic layer in the denitrating reactor 3, NOx present in the exhaust gas is decomposed into $N_2$ and $H_2O$.

Next, the exhaust gas passes through an air preheater 4, an electric dust collector 5 and an induced draft fan (not shown), and is then discharged through a chimney 6 to the atmosphere.

In the above air preheater 4, heat exchange is carried out between the exhaust gas and air, and preheated air is fed to the fire furnace 1 through an air duct 7 and is then used as air for combustion.

On the other hand, the fly ash collected by the electric dust collector 5 is partially or all returned to the fire furnace 1 through an ash transport pipe 8, since the fly ash still contains a good deal of unburned ash. After burned and melted again in the fire furnace 1, the fly ash is discharged through a bottom hopper (not shown).

In such a fly ash recycle type boiler, for example, arsenic and chlorine substances which are components of a coal are gasified, and these components become fine particles on a downstream heat transfer surface along with a drop in gas temperature. Most of the thus formed fine particles are collected together with the fly ash by the electric dust collector 5. The collected fly ash is returned to the fire furnace 1, and some components in the fly ash are gasified again.

As this process is repeated, the gasified components are gradually concentrated in the boiler exhaust gas. Therefore, when the denitrating reactor 3 is disposed between the outlet of the economizer and the inlet of the air preheater 4, the thus concentrated gaseous components, particularly, arsenic substances are accumulated on the catalyst in the denitrating reactor 3, with the result that the catalyst deteriorates inconveniently.

OBJECT AND SUMMARY OF THE INVENTION

The present invention is directed to an apparatus for solving the drawback of a conventional system, and is characterized by removing arsenic substances from solids such as fly ash and the like prior to recycling the solids through a fire furnace.

In the present invention, the fire furnace is, for example, a coal-fired boiler.

As concrete methods for the removal of the arsenic substances from the solids, there are a method of heating, preferably, up to 1,200° C. or more and a method of removing the arsenic substances by washing.

In addition, a method is also suggested in which the solids having a particle diameter of 10 μm or less which are collected by a dust collector are discarded. Further, there is a method in which the solids having a particle diameter of 10 μm or less which are collected by a dust collector are discarded and the remaining solids are heated or washed to eliminate the arsenic substances therefrom.

If the method of the present invention is employed, the arsenic substances can be inhibited from accumulating on a catalyst in order to thereby prevent the deterioration of the catalyst. That is, when the solids (fly ash) are heated, the arsenic substances in the solids are gasified at thousand and hundreds of centigrade degrees, whereby most of the arsenic substances can be removed therefrom. Further, also by washing, the arsenic substances in the solids can be removed therefrom. Furthermore, there is the tendency that the smaller an average particle diameter of the solids is, the greater a concentration of arsenic is, and therefore the arsenic substances can also be removed by discarding the solids having a particle diameter of 10 μm or less. In addition, a combination of these methods can heighten a removal effect of the arsenic substances.

DETAILED DESCRIPTION OF THE PREFERRED EMBODIMENTS

The present invention will be described in detail as embodiments.

Figure 1:
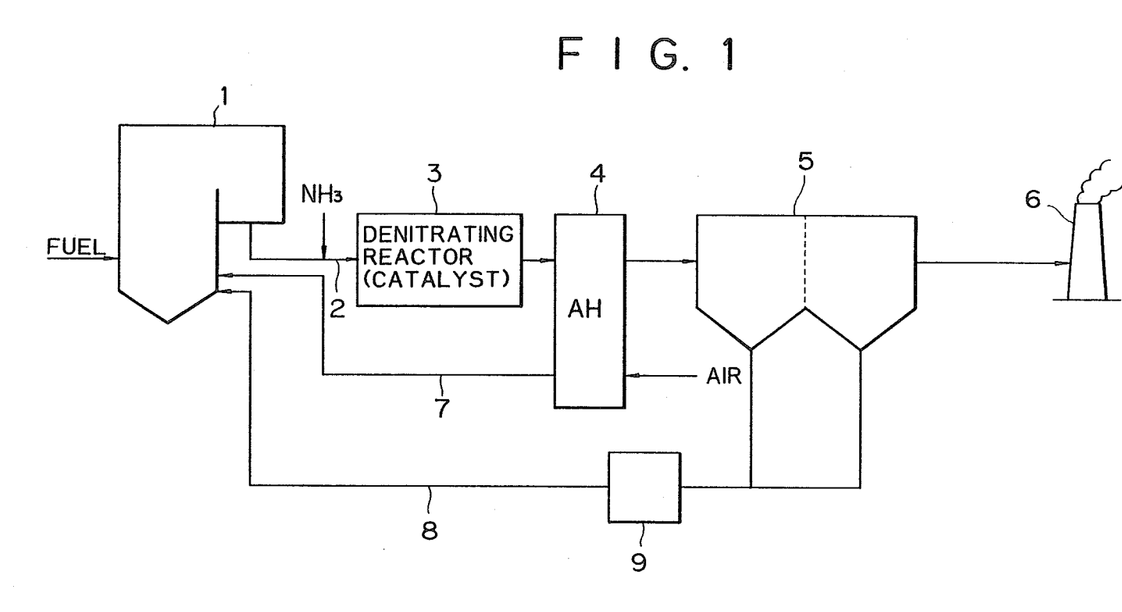
FIG. 1 is a block diagram illustrating an apparatus for treating a combustion exhaust gas of the present invention.

Referring to FIG. 1, an electric oven 9 is disposed as a means for heating fly ash in the middle of an ash transport pipe 8 for delivering the fly ash in an electric dust collector 5 to a fire furnace 1. The other constitution is the same as in a conventional system (in FIG. 4). Incidentally, as the heating means, any known heating device other than the electric oven 9 can be utilized.

In FIG. 1, the fly ash collected in the electric dust collector 5 is conducted to the electric oven 9, in which the fly ash is then heated up to 1,000° C. or more. At this time, arsenic substances contained in the fly ash are gasified. The gasified arsenic substances are collected therein, and the fly ash free from the arsenic substances is circulated through the fire furnace 1. In this way, the arsenic substances can be inhibited from concentrating in the combustion exhaust gas, and therefore a catalyst in a denitrating reactor 3 can be prevented from deteriorating, whereby the efficiency of the denitration can be kept up.

The effect of the present invention will be elucidated in detail in accordance with experiments.

An apparatus shown in FIG. 1 was used. A combustion exhaust gas containing 500 ppm of NOx and 25 ppm of arsenic substances which had been generated in the fire furnace 1 was first delivered to the denitrating reactor 3 in which a titania catalyst was arranged, and a denitration reaction was performed therein. In consequence, as shown in Table 1, a concentration of the arsenic substances in the catalyst increased along with the lapse of time, whereby a ratio of the denitration fell.

TABLE 1

| Aging (Time) | Ratio of Denitration (%) | Conc. of As in Catalyst (ppm) |
|---|---|---|
| 0 | 95 | about 0 |
| 30 min | 94 | 35 |
| 1 hr | 90 | 500 |
| 10 hr | 65 | 10000 |

Next, fly ash collected in the electric dust collector 5 was heated which was composed of 41.5% of $SiO_2$, 22.2% of $Al_2O_3$, 11.6% of $Fe_2O_3$, 1.7% of CaO, 1.5% of MgO, 2,500 ppm of the arsenic substances and 1,000 ppm of Cl. As a result, it was found that when the fly ash was heated up to 1,200° C. or more, most of the arsenic substances were removed from the fly ash, as shown in Table 2. This is due to the fact that the arsenic substances are gasified at thousand and hundreds of centigrade degrees and is separated from the fly ash.

TABLE 2

| | Components of Ash | | | | | | |
|---|---|---|---|---|---|---|---|
| Sample | $SiO_2$ (%) | $Al_2O_3$ (%) | $Fe_2O_3$ (%) | CaO (%) | MgO (%) | $As_2O_3$ (ppm) | Cl (ppm) |
| Collected Ash | 41.5 | 22.2 | 11.6 | 1.7 | 1.5 | 2500 | 1000 |
| Heated to 800° C. | 41.5 | 22.2 | 11.6 | 1.7 | 1.5 | 2500 | 800 |
| Heated to 1000° C. | 41.5 | 22.2 | 11.6 | 1.7 | 1.5 | 2400 | 100 |
| Heated to 1200° C. | 41.5 | 22.2 | 11.6 | 1.7 | 1.5 | 1500 | 30 |
| Heated to 1500° C. | 41.5 | 22.2 | 11.6 | 1.7 | 1.5 | 500 | 10 |
| Heated to 1800° C. | 41.5 | 22.2 | 11.6 | 1.7 | 1.5 | 10 | 10 |

Next, the electric oven 9 was replaced with a washing means 9 (the same reference numeral was used). Washing procedure by the use of this washing means 9 was as follows:

A value of pH of each washing solution stored in a container was adjusted with $HNO_3$ or NaOH. To each washing solution, fly ash (collected ash) having a composition shown in Table 3 was added, and the solution was then allowed to stand for about 60 minutes. At this time, the weight of the washing solution was about 9 times as much as that of the fly ash.

After the standing, the solution was separated into a solid and a liquid, and this solid was then introduced into the fire furnace 1. The composition of the separated solid is set forth in Table 3. It is apparent from the results in Table 3 that the arsenic substances can be remarkably removed particularly on acid side and alkali side.

As the agents for adjusting the pH, sulfuric acid, hydrochloric acid, aqueous ammonia, KOH, hydrazine and the like are also effective in addition top the abovementioned ones.

TABLE 3

| | Components of Ash | | | | | | |
|---|---|---|---|---|---|---|---|
| Sample | $SiO_2$ (%) | $Al_2O_3$ (%) | $Fe_2O_3$ (%) | CaO (%) | MgO (%) | $As_2O_3$ (ppm) | Cl (ppm) |
| Collected Ash | 41.5 | 22.2 | 11.6 | 1.7 | 1.5 | 2500 | 1000 |
| Solid washed with nitric acid solution (pH = 1.5) | 41 | 21.5 | 11 | 1.4 | 1.4 | 100 | 770 |
| Solid washed with nitric acid solution (pH = 3.5) | 41 | 21.5 | 11.5 | 1.5 | 1.4 | 1100 | 750 |
| Solid washed with industrial water (pH = 6.5-7) | 41.5 | 22 | 11.6 | 1.6 | 1.5 | 2450 | 700 |
| Solid washed with NaOH solution (pH = about 9) | 41.5 | 21 | 11.4 | 1.6 | 1.5 | 1500 | 770 |
| Solid washed with NaOH solution (pH = about 11) | 41.5 | 21.5 | 11.1 | 1.6 | 1.5 | 300 | 800 |

Next, another embodiment, in which solids of 10 μm or less in particle diameter collected by a dust collector are discarded, will be described in reference to FIG. 2.

Figure 2:
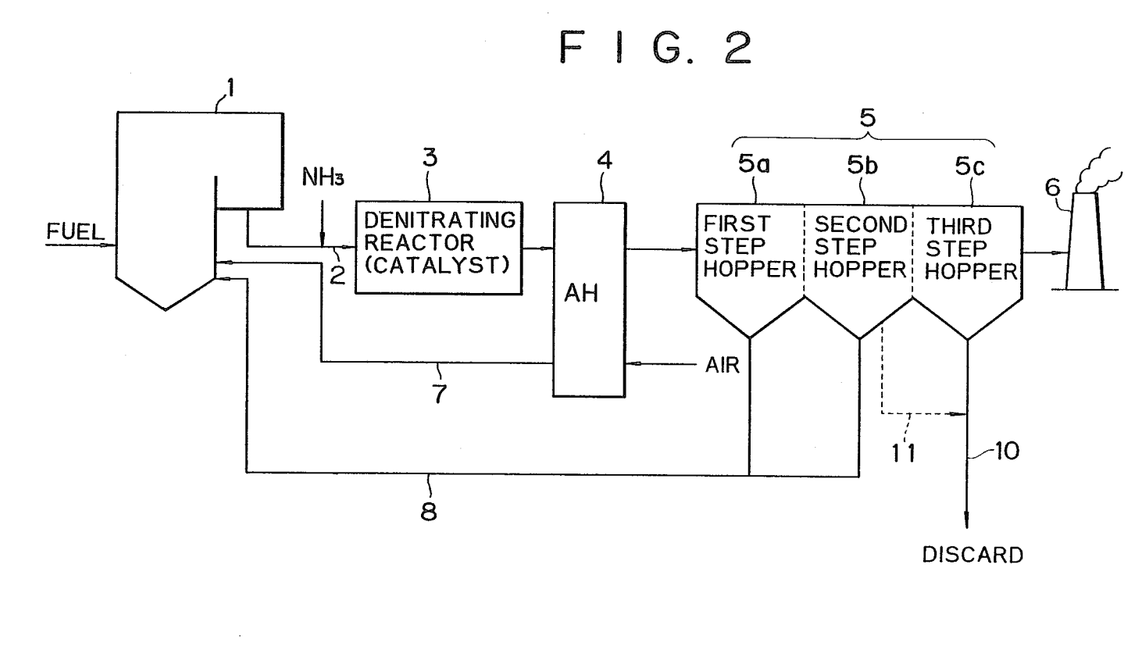
FIG. 2 is a block diagram illustrating another embodiment of the apparatus for treating the combustion exhaust gas of the present invention.

Referring to FIG. 2, reference numeral 1 is a coal-fired boiler. In this boiler, a finely ground coal was burned with the aid of air. A dust collector 5 was equipped with first, second and third step hoppers 5a, 5b and 5c. In the first step hopper 5a, solids of 50 to 100 μm in particle diameter were collected in a ratio of about 70% of the total ash. In the second step hopper 5b, the solids of 10 to 50 μm in particle diameter were collected in a ratio of about 20% of the total ash. In the third step hopper 5c, the solids of 10 μm or less in particle diameter were collected in a ratio of about 10 to 12% of the total ash.

The solids collected by the first and second hoppers 5a, 5b were returned to the boiler 1 through an ash transport pipe 8 disposed under the hoppers. On the other hand, the solids of 10 μm or less in particle diameter collected by the third hopper 5c were discarded through an ash discard pipe 10 disposed under the hopper. Further, an ash discharge pipe 11 connecting to the ash discard pipe 10 may be provided at a rear bottom portion of the second step hopper 5b, so that in a certain case, the solids having a small particle diameter can be discarded from the second step hopper 5b. This ash discharge pipe 11 can be used to discard a portion of the solids in the second step hopper 5b and to thereby maintain a discard ratio at a level of about 10 to 12%, when the discard ratio of the third hopper 5c is less than 10% of the total ash. The other constitution is the same as in the conventional case.

Figure 5:
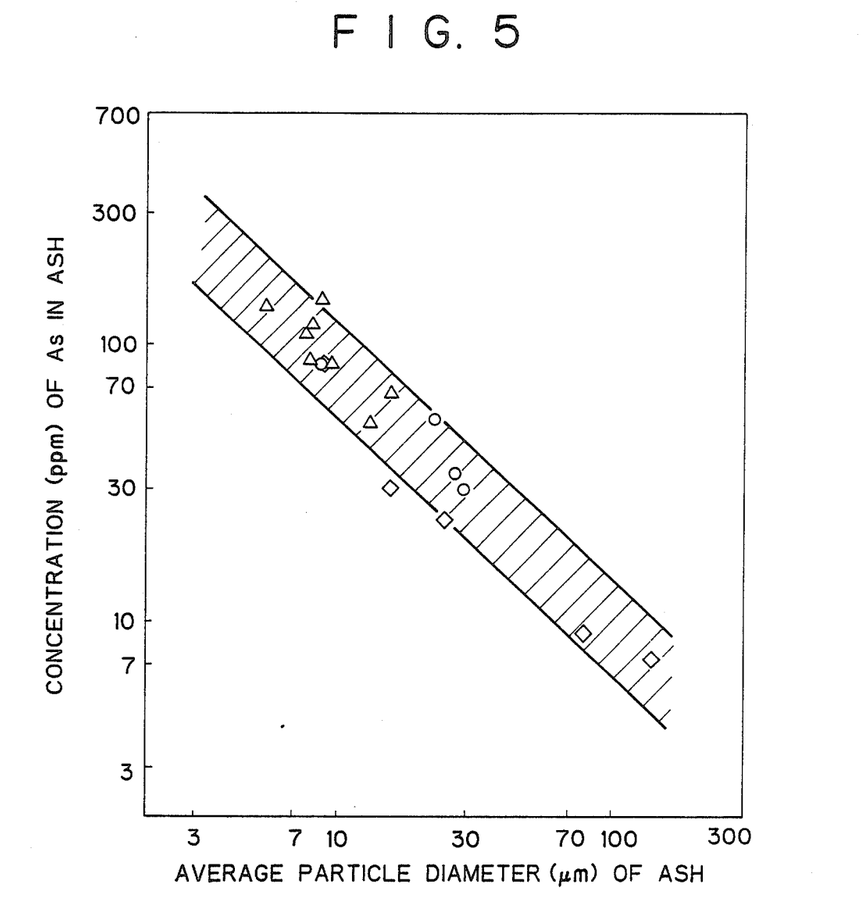
FIG. 5 is a characteristic view illustrating a relation between an average particle diameter of ash and a concentration of arsenic in the ash.

Here, the relation between an average particle diameter of the ash (solids) collected by the dust collector 5 and a concentration of arsenic in the solids is shown in FIG. 5. As is apparent from FIG. 5, there is the tendency that the smaller the average diameter of the ash is, the higher the concentration of arsenic is. This fact means that the discard of the solids having a small particle diameter is effective to prevent the concentration phenomenon of arsenic in the exhaust gas.

Figure 6:
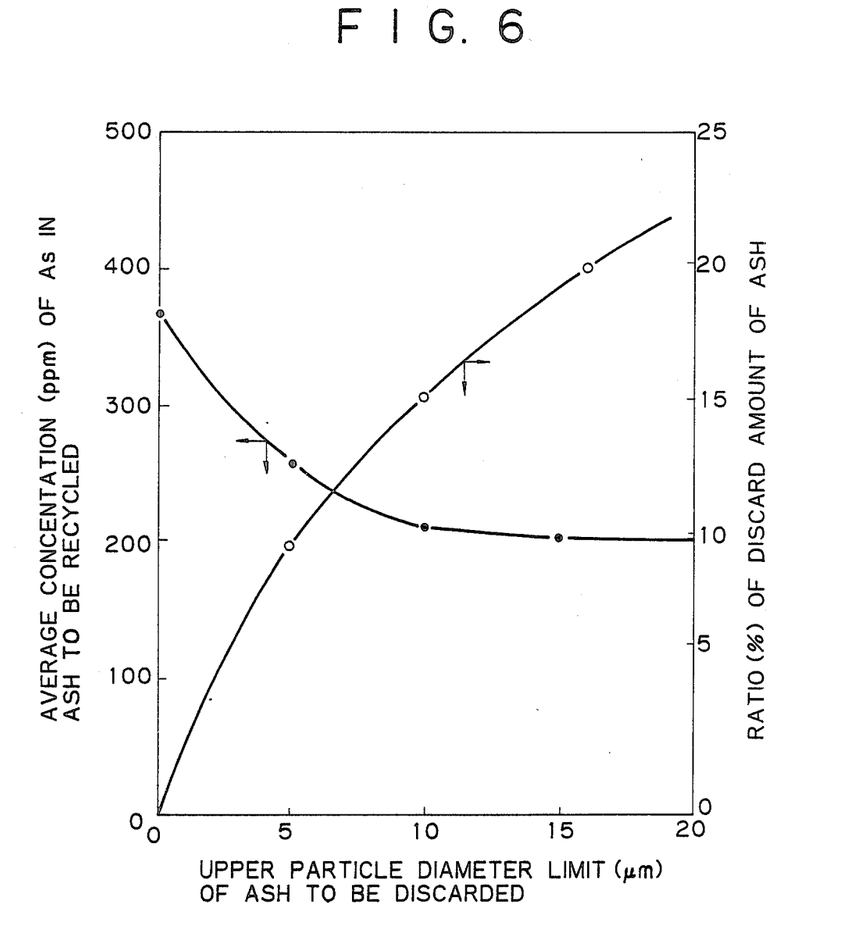
FIG. 6 is a characteristic view illustrating relations between an upper particle diameter limit of the ash to be discarded and an average concentration of arsenic and between the upper particle diameter limit and a ratio of the discard amount of the ash with respect to the total amount of the ash.

Next, in order to discard the ash (solids) having a predetermined particle diameter and to recycle the remaining solids through the fire furnace 1, it is necessary to elucidate the relations between an upper particle diameter limit of the ash to be discarded and an average concentration of arsenic in the ash to be recycled, and between the upper particle diameter limit and a ratio of a discard amount with respect to the total ash. These relations are shown in FIG. 6. In this case, the concentration of As in the collected ash in the electric dust collector 5 is 370 ppm.

As is apparent from the results of FIG. 6, even if the upper particle diameter limit of the ash to be discarded is in excess of 10 μm (e.g., even if the solids of 15 μm or less in particle diameter are discarded), the average concentration of arsenic in the ash to be recycled does not fall sufficiently. However, for the improvement in fuel effeciency, it is desirable that the amount of the discarded ash is small. When the upper particle diameter limit of the ash to be discarded exceeds 10 μm, the ratio of the ash to be discarded is too high (e.g., when the solids having a particle diameter of 15 μm or less are discarded, the ratio of the solids to be discarded is about 20% in accordance with the relation in FIG. 6). Consequently, as operating conditions of the plant, the upper particle diameter limit is preferably 10 μm or less.

Figure 7:
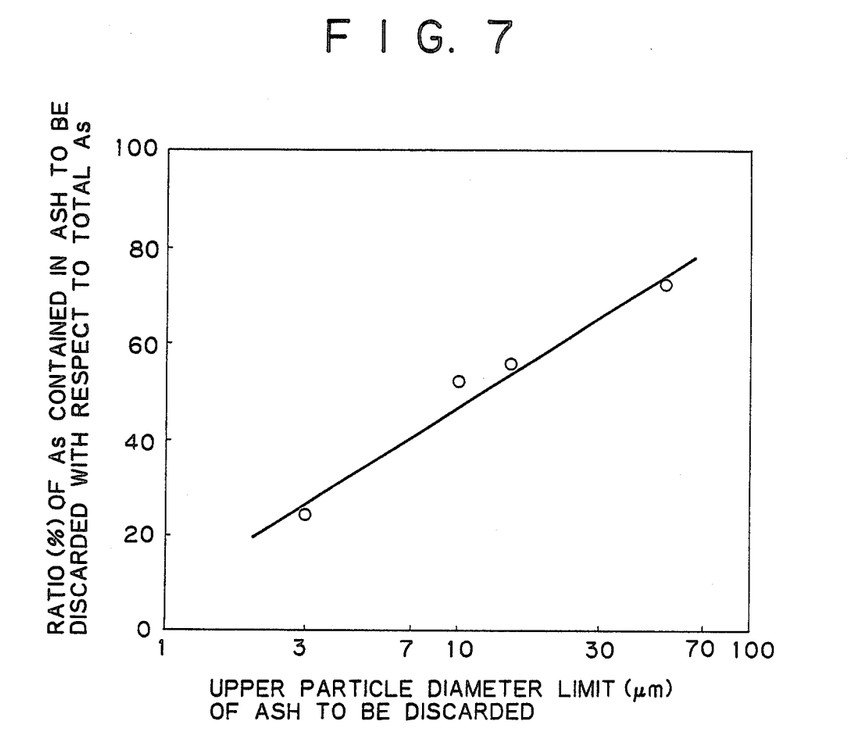
FIG. 7 is a characteristic view illustrating a relation between the upper particle diameter limit of the ash to be discarded and a ratio of the discard amount of arsenic in the ash with respect to the total arsenic.

Furthermore, FIG. 7 shows the relation between an upper particle diameter limit of the ash (solids) to be discarded and a ratio of arsenic in the ash to be discarded with respect to the total arsenic. As is definite from FIG. 7, when the solids having a particle diameter of 10 μm or less are discarded, about 50% of arsenic can be removed therefrom.

As discussed above, when, of the solids collected by the dust collector, the solids having a particle diameter of 10 μm or less are discarded, the major part of arsenic in the solids can be removed therefrom, so that the concentration phenomenon of arsenic present in the exhaust gas can be inhibited and the deterioration of a denitrating catalyst can be prevented.

FIG. 6 indicates that a discard ratio is about 15% in the case that the solids having a particle diameter of 10 μm or less are discarded, but this discard ratio depends on properties of the coal (the amount of contained arsenic). However, it is preferred that the ratio of the discard is about 10%, even in the case that the amount of arsenic contained in the coal is small.

Further, the dust collector 5 in FIG. 2 is composed of the three step hoppers, but as the dust collector, various modifications can be conceived. For example, the dust collector 5 may be composed of two step hoppers having different sizes, and the size (area) of the downstream hopper may be decided so that the solids can be collected in a ratio of about 10% of the total solids.

In addition, another embodiment of the present invention will be described in reference to FIG. 3 in which the solids having a particle diameter of 10 μm or less which are collected by the dust collector 5 are discarded and arsenic is further removed by heating or washing prior to recycling the remaining solids through the fire furnace 1.

Figure 3:
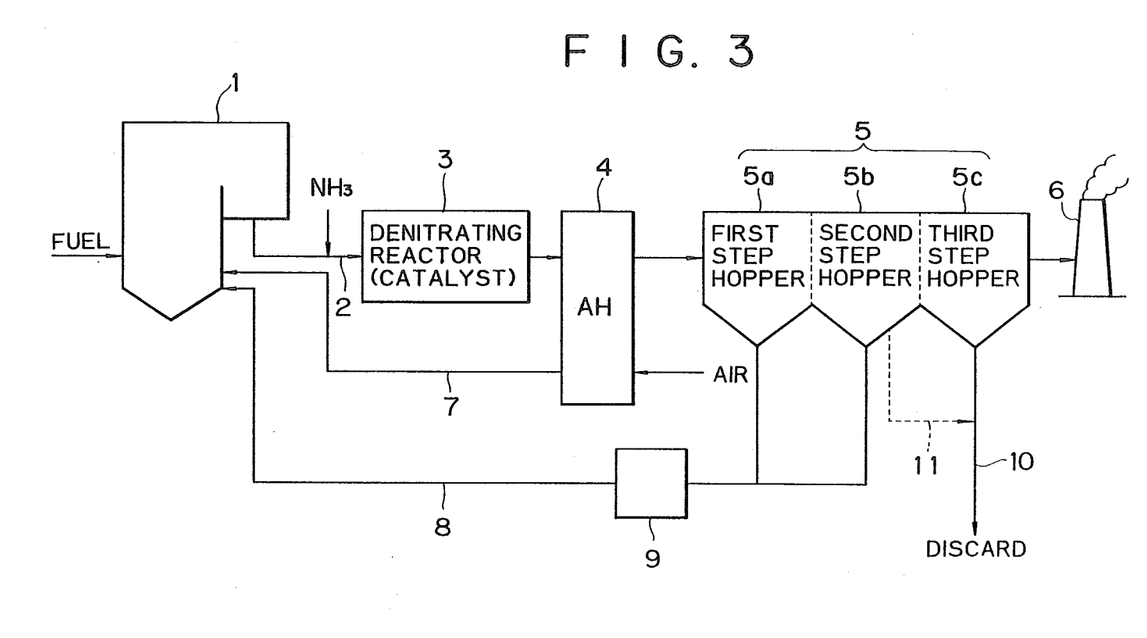
FIG. 3 is a block diagram illustrating still another embodiment of the apparatus for treating the combustion exhaust gas of the present invention.

In FIG. 3, a dust collector 5 is equipped with first, second and third step hoppers 5a, 5b and 5c, and an ash discard pipe 10 is connected to the third step hopper 5c. An ash discharge pipe 11 is provided at the rear bottom portion of the second step hopper 5b and is connected to the ash discard pipe 10. An electric oven 9 (or a washing means) is provided in the middle of an ash transport pipe 8 connecting to the dust collector 5. The other constitution is the same as in the embodiment shown in FIG. 4.

Of a collected ash in which a concentration of arsenic substances was 370 ppm, the ash (solids) having a particle diameter of 10 μm or less was discarded, and the remaining ash was recycled through the fire furnace 1. At this time, heating or washing was carried out under conditions shown in Table 4. Variation in the concentration of arsenic in this case is set forth in Table 4. The results in Table 4 indicate that the combination of the descard of the ash having a particle diameter of 10 μm or less and the heating or washing of the remaining ash is more effective to remove the arsenic substances therefrom.

TABLE 4

| Sample | | As₂O₃ (ppm) |
|---|---|---|
| Collected Ash | | 370 |
| Of the collected ash, the ash having a particle diameter of 10 μm or less was discarded. The remaining ash was recycled through the boiler. At this time, the ash being recycled was heated. | Without heating | 210 |
| | Heated at 800° C. | 210 |
| | Heated at 1000° C. | 200 |
| | Heated at 1200° C. | 130 |
| | Heated at 1500° C. | 40 |
| | Heated at 1800° C. | 1 |
| Of the collected ash, the ash having a particle diameter of 10 μm or less was discarded. The remaining ash was recycled through the boiler. At this time, the ash being recycled was washed. | Without washing | 210 |
| | Washed with nitric acid solution (pH = 1.5) | 10 |
| | Washed with nitric acid solution (pH = 3.5) | 90 |
| | Washed with industrial water (pH = 6.5–7) | 205 |
| | Washed with NaOH solution (pH = about 9) | 130 |
| | Washed with NaOH solution (pH = about 11) | 30 |

According to the apparatus of the present invention, the concentration of arsenic substances in an exhaust gas can be inhibited, and the deterioration of a denitrating catalyst which results in the concentration of the arsenic substances can be prevented.

What is claimed is:

1. An apparatus for treating a combustion exhaust gas which comprises a fire furnace, a denitrating reactor for denitrating said combustion exhaust gas discharged from said fire furnace, a dust collector for collecting solids in said exhaust gas passed through said reactor, and a transport pipe for circulating said solids collected by said dust collector through said fire furnace, said apparatus being characterized in that said transport pipe is provided with an arsenic removal means for removing arsenic from said solids.

2. An apparatus for treating a combustion exhaust gas according to claim 1 wherein said arsenic removal means is a heating device.

3. An apparatus for treating a combustion exhaust gas according to claim 1 wherein said arsenic removal means is a washing device.

4. An apparatus for treating a combustion exhaust gas which comprises a fire furnace, a denitrating reactor for denitrating said combustion exhaust gas discharged from said fire furnace, a dust collector for collecting solids in said exhaust gas passed through said reactor, and a transport pipe for circulating said solids collected by said dust collector through said fire furnace, said apparatus being characterized in that said dust collector is provided with a means for discarding said solids having a particle diameter of 10 $\mu$m or less.

* * * * *